UNITED STATES PATENT OFFICE.

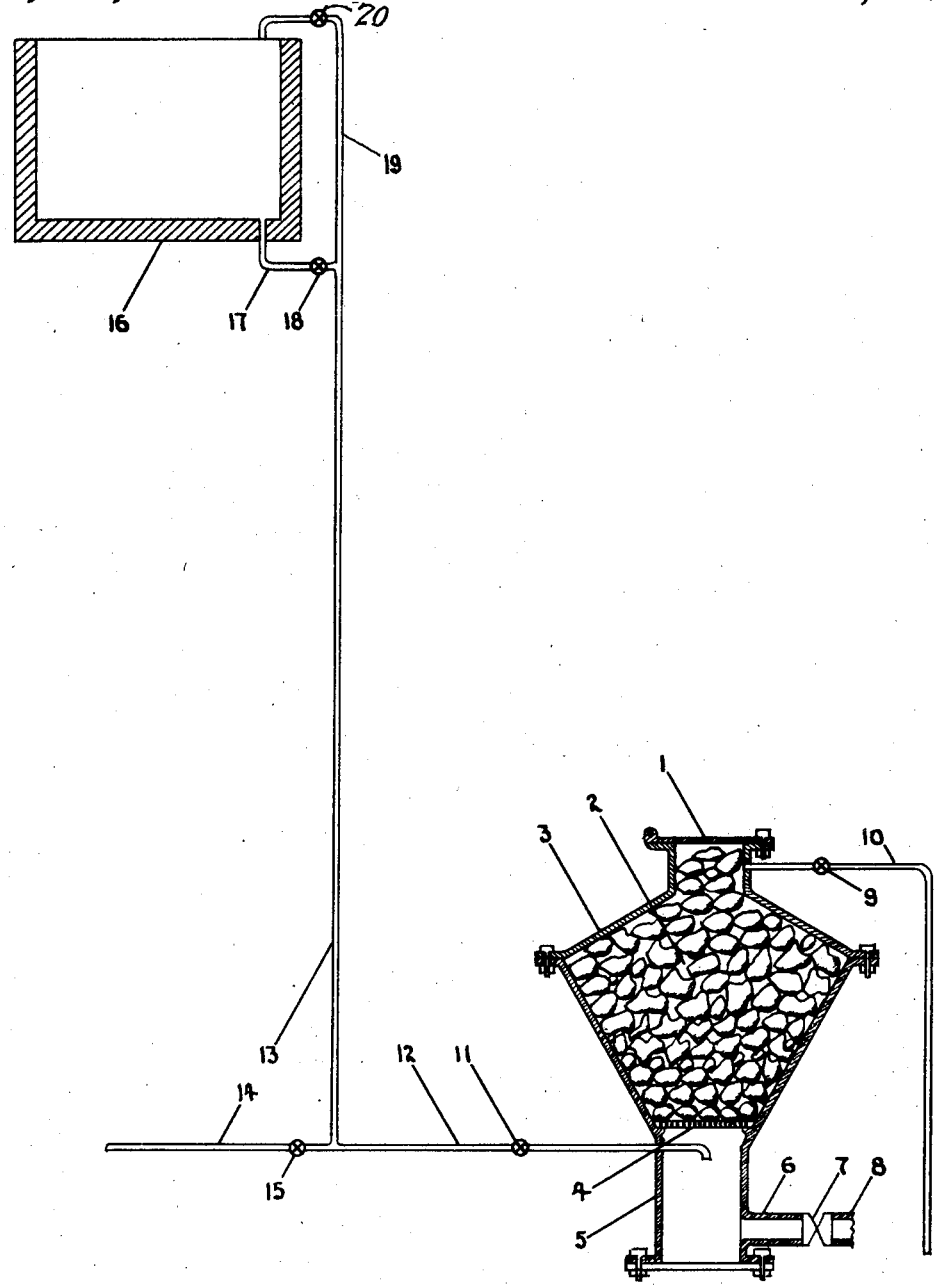

FREDERICK W. THOROLD, OF TORONTO, ONTARIO, CANADA.

METHOD OF MAKING AND TRANSPORTING SOLUTIONS.

1,344,102.      Specification of Letters Patent.      Patented June 22, 1920.

Application filed May 29, 1918. Serial No. 237,333.

*To all whom it may concern:*

Be it known that I, FREDERICK W. THOROLD, a citizen of the Dominion of Canada, and a resident of Toronto, county of York, and Province of Ontario, Canada, have invented a new and useful Improvement in Methods of Making and Transporting Solutions, of which the following is a specification.

My invention relates to methods or processes of dissolving solid or plastic substances that solutions of predetermined strength may be obtained therefrom and pertains specifically to a novel method of making and transporting such solutions.

My invention while applicable to use in many arts as will hereinafter be pointed out and discussed, finds one of its chief applications in the preparation and transportation of alum solutions for use in conjunction with water filtration plants. The method at present used in preparing alum solutions for the above noted purpose consists in introducing the alum in solid form into vats which in order that the solution may be subsequently fed from the vat by gravity are invariably placed at a considerable height from the floor level, thereafter adding water and finally agitating the water and alum by mechanical means until the alum is dissolved. This procedure requires that the alum must be lifted by mechanical or manual energy to a height sufficient to enable it to be introduced into the vat and this expenditure of energy with the expenditure of energy necessary to transport the solid alum to the vat from the point of storage, usually on the ground level, and the expenditure of energy necessary to operate the mechanical agitators constitutes quite a large item in the expense of operating the plant. Further, it is for obvious reasons almost impossible to maintain such a plant in the state of cleanliness and sanitation now beginning to become recognized as a necessity.

It is the principal object of my invention to eliminate these disadvantages at present inherent in such processes and to that end my improved method employs a solvent under pressure and utilizes its solvent or leaching property as well as its kinetic energy, due to pressure, to both produce a solution of the required strength and to transport the same to any predetermined point at any selected level to facilitate subsequent use of the solution. In this manner, by utilizing both the leaching property of the solvent and its mechanical energy due to its head or pressure I eliminate the necessity of applying mechanical energy in the process of dissolving the substance or to transport the resultant solution, and reduce the expenditure of manual energy necessary to transport the substance to be dissolved to a minimum, as will hereinafter be more fully explained.

In the drawing which accompanies and forms a part of this specification I have illustrated a partially sectioned and diagrammatic elevation of a simple form of device for carrying out my improved method.

My improved method is independent of the form and size of apparatus used and many devices already used for other purposes may be utilized to carry out my method. However, to more clearly disclose my method I will proceed first to describe the simple apparatus illustrated in the drawing.

Referring now to the drawing, the device illustrated for carrying on my method comprises a container which may obviously be of any size or shape and of any suitable material and may, as shown, be constructed of enameled iron of two substantially funnel shaped flanged members as 3 and 5 which are joined to each other by means of bolts passing through the flanges provided upon their major diameters, as indicated, to form the container. The upper member 3 is provided with an aperture for the introduction of the substance to be dissolved and is adapted to be closed in a liquid tight manner by means of either a hinged, bolted or other suitable cover 1 which is adapted to seat when closed in a liquid tight manner. A grating 4 of any suitable material, preferably of wood, if the device is used to produce alum solutions, is supported within the container by means of lugs as shown and serves to support the substance 2 to be dissolved. The lower member 5 of the container is considerably constricted, with regard to its cross sectional area, below the supporting grate 4 and is closed in a liquid tight manner at the lowermost aperture by means of a cover bolted to a flange as indicated. A lateral outlet 6 is provided near the lowermost portion of the member 5 by means of which the container is connected to a drain pipe 8. A valve 7 is provided in the drain pipe 8. A pipe 10 enters the container at a point above the supporting grate 4 and above the substance to be dissolved and is adapted to lead the water or other solvent into the container. A needle valve 9 or "rate of flow" valve is provided in the pipe 10 by means of which the rate of flow of the solvent to the container may be regulated. Obviously if the flow of solvent through the container is large in comparison to the amount of substance therein the resultant solution will be weak and conversely if the flow of solvent is small in relation to the amount of substance the resultant solution will be concentrated. If a suitable tank is provided to receive the resultant solution it is obvious that the amount of solvent utilized may be regulated or proportioned to the weight of substance to be dissolved to provide in the receiving tank a solution of definite specific gravity or the amount of substance to be dissolved may always be maintained greatly in excess of the amount of solvent used and a concentrated solution may thus always be expelled from the device. This solution may subsequently, by the addition of fresh solvent, be diluted to the required strength. A pipe 12 enters the container at a point below the supporting grate 4 and is adapted to lead off the solution from the container to any convenient point for storage or subsequent use. This may be conceivably a tank 16 fed from pipe 12 by means of a branch pipe 13 through either a pipe 17 entering the bottom of the tank or through a pipe 19 entering the top of the tank, or the solution may be carried to other places convenient for use by means of the branch pipe 14. Valves 11, 15, 18 and 20 are provided as indicated in the solution pipe line to control the flow and destination of the solution.

My improved method of making a concentrated solution of say alum and water and transporting the same to any desired point for subsequent use without re-handling and with the device shown in the drawing is as follows: The container, conceived to be large enough to hold several days' supply of substance to be dissolved is first filled with say aluminum sulfate, the valve 7 is closed and the solvent from a supply of the same under constant pressure, in the case under discussion, water from the city water supply and under city water pressure is allowed to enter the container through the pipe 10. The rate of flow of water into the container is retarded by means of the valve 9 until a saturated solution is forced out of the container under pressure of the city water supply and through pipes 12 and 13 into tank 16 or through pipe 14 to any other desired point convenient for subsequent use.

To, by my improved method, produce a solution of definite strength at any point within reach of the pressure of the solvent supply without re-handling of the substance to be dissolved and without pumping, the valve 7 is shut, a known weight of the substance to be dissolved is placed in the container and a definite quantity of solvent is run through the substance to be dissolved at a rate, controlled by the valve 9, which will insure that all of the substance to be dissolved has been dissolved when a predetermined quantity of solvent has passed therethrough. The amount of solvent necessary may conveniently be determined by adjusting the valve 9 so that the tank 16, which will hold the required definite amount of solvent and which is placed at any convenient place within the reach of the pressure on the solvent, can only be filled to a certain mark thereon in the time taken to dissolve the largest particle of substance to be dissolved in the container. Obviously the adjustment of the valve 9 for this purpose must be determined by experiment for each different substance to be dissolved.

Whether a concentrated solution or solution of any other definite strength is made the supply of solvent is shut off when the substance to be dissolved is entirely dissolved, the valve in the solution pipe line 12 is shut and the cover 1 is removed, after which the gate valve 7 is opened to drain the container, which is then in a condition to receive another supply of substance to be dissolved.

It will be observed from the foregoing that my improved method is applicable to many uses in many arts. For example, it may be used by druggists or manufacturing chemists to prepare chemical solutions. It may be used to prepare a solution of chlorid of lime for the purpose of bleaching. It may be used to prepare lime solutions in tanneries. It may be further used in canning factories or packing houses to prepare brine solutions, or it may be used in preparing inks or dyes of all kinds. Obviously a filter or strainer may be placed in the path of the solvent to remove sediment or other particles. It is further obvious that while I have shown a supporting grating for the substance to be dissolved that I may eliminate such a grating and entirely fill the container with the substance to be dissolved.

It will be noticed that my improved method of preparing solutions and transporting the same to locations convenient for subsequent use utilizes both the leaching or solvent property of the solvent as well as its kinetic energy due to its head or pressure and that I thereby am able to practically simultaneously produce a solution and transport the same to selected points at selected levels which renders the subsequent use of the solution convenient and that I accomplish this desirable result without the aid of any additional mechanical or manual energy. My improved method is therefore clean and sanitary and it thus reduces the cost of such operations to a minimum.

Having thus described my invention what I claim as new and desire to secure by United States Letters Patent is as follows:

The method of making and transporting solutions which comprises, interposing a measured quantity of the substance to be dissolved in the path of a uni-directional flow of solvent under pressure, utilizing the pressure of the solvent to transport the substance in the form of a solution to a receptacle of measured capacity, and regulating the rate of flow of said solvent so that all of the substance shall have been transported to said receptacle when said receptacle is filled to its measured capacity with solution.

Signed by me at Toronto, county of York, and Province of Ontario, in the presence of two witnesses.

FREDERICK W. THOROLD.

Witnesses:
Wm. J. Herdman,
D. S. Tovell.